UNITED STATES PATENT OFFICE.

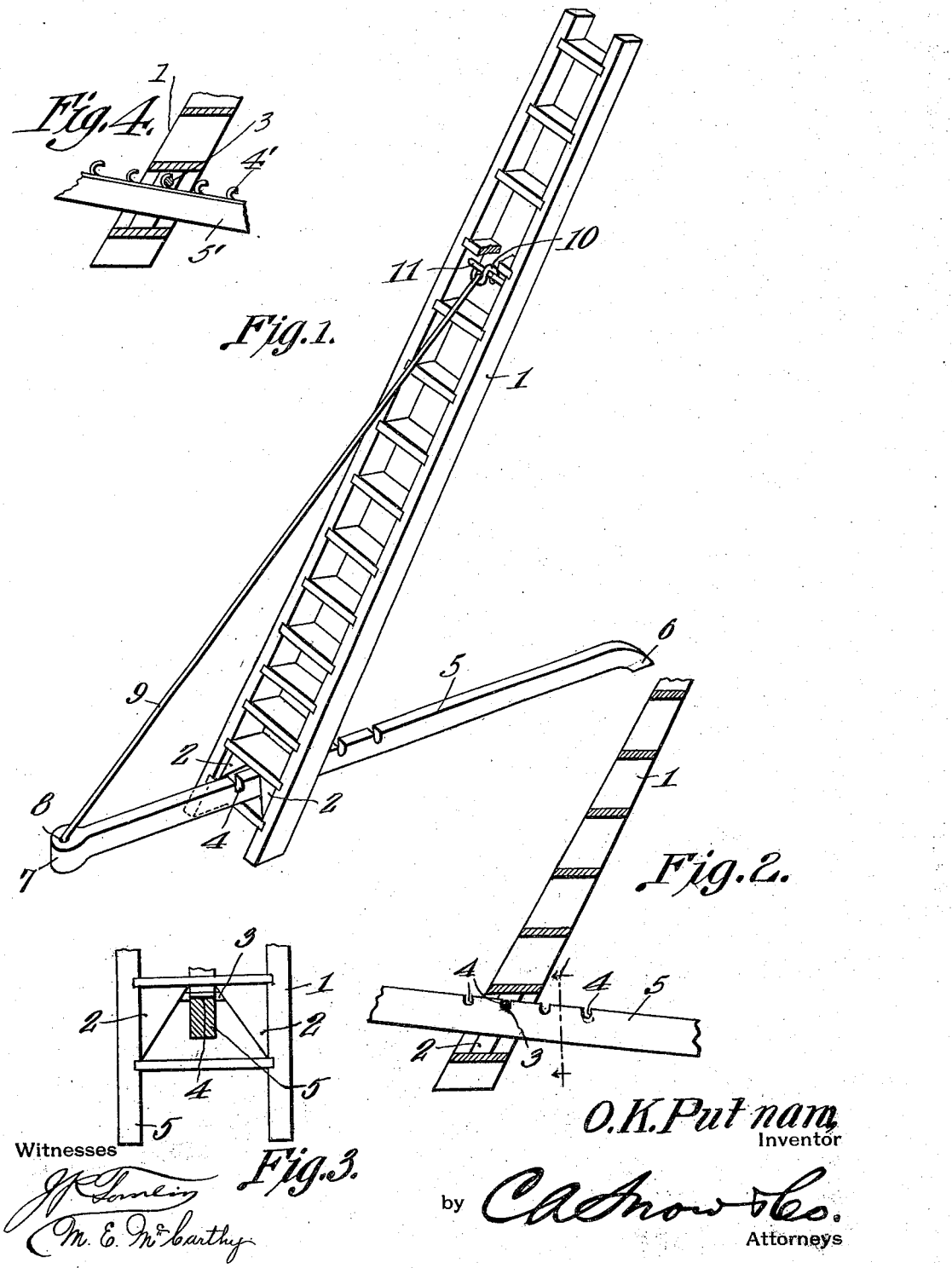

OLIVER K. PUTNAM, OF ORANGE, CALIFORNIA.

LADDER.

1,170,933. Specification of Letters Patent. Patented Feb. 8, 1916.

Application filed December 10, 1914. Serial No. 876,546.

*To all whom it may concern:*

Be it known that I, OLIVER K. PUTNAM, a citizen of the United States, residing at Orange, in the county of Orange and State of California, have invented a new and useful Ladder, of which the following is a specification.

The present invention relates to improvements in ladders, one object of the invention being the provision of a ladder especially adapted for use in picking fruit from lemon, orange, grape fruit or other trees of that type in which the branches grow close to the ground, the fruit on the lower branches being damaged if an inner, ladder-supporting brace is thrust in among the lower branches.

To provide a ladder which will combine stability with a minimum injury to fruit upon the ground-sweeping branches of a tree, is the object of this invention.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a perspective of the complete ladder. Fig. 2 is a vertical sectional view through the ladder showing the arm and tension connection in elevation. Fig. 3 is a detail view of the pivotal connection between the ladder and the arm. Fig. 4 illustrates another means for detachably connecting the arm to the ladder.

Referring to the drawings, the numeral 1, designates a ladder, which is provided adjacent its lower end with two blocks 2 carrying a transversely disposed pin or pivoting member 3. This pivoting member or pin 3 is adapted to seat any of the recesses 4 of a bracing arm 5, which is provided with a foot portion of the arm 5 for engagement with the ground. The outer end is reinforced as at 7 and is apertured to receive one end 8 of a cable 9, said cable 9 having its upper end connected by an S-shaped hook 10 to a transverse pin or rod 11 disposed below one of the steps of the ladder adjacent the upper end thereof. It will thus be seen that the incline at which the ladder is supported depends entirely upon which one of the recesses 4 of the bracing arm 5 is in engagement with the pin 3. The ground engaging end 6 of the arm 5 may be placed below the branches of the tree so the ladder will be inclined exteriorly of the tree to permit the fruit gatherer to work at either side of the ladder.

As shown in Fig. 4, the arm 5′, is provided with a plurality of metal hooks 4′, adapted to engage the pivoting member 3.

What is claimed is:

1. A device for use in picking fruit from the upper portions of trees having branches which lie close to the ground, and comprising an arm having an inner, ground-engaging end; a ladder pivotally engaged intermediate its ends with the arm intermediate the ends of the arm and overhanging the inner end of the arm, the space between the inner end of the arm and the ladder being unencumbered; and an upwardly prolonged tension connection uniting the outer end of the arm and the ladder.

2. A device for use in picking fruit from the upper portions of trees having branches which lie close to the ground, and comprising an arm having an inner, ground-engaging end; a ladder overhanging the inner end of the arm, the space between the inner end of the arm and the ladder being unencumbered; an upwardly prolonged tension connection uniting the outer end of the arm with the ladder; and an adjustable, step-by-step connection between the intermediate portion of the arm and the intermediate portion of the ladder.

In testimony that I claim the foregoing as my own, I have hereto affixed my signature in the presence of two witnesses.

OLIVER K. PUTNAM.

Witnesses:
B. J. FLETCHER,
J. R. PORTER.